United States Patent
Duty et al.

(10) Patent No.: US 10,124,531 B2
(45) Date of Patent: Nov. 13, 2018

(54) RAPID NON-CONTACT ENERGY TRANSFER FOR ADDITIVE MANUFACTURING DRIVEN HIGH INTENSITY ELECTROMAGNETIC FIELDS

(71) Applicant: UT-Battelle, LLC, Oak Ridge, TN (US)

(72) Inventors: Chad E. Duty, Loudon, TN (US);
Vlastimil Kunc, Concord, TN (US);
Lonnie J. Love, Knoxville, TN (US);
William H. Peter, Knoxville, TN (US);
Orlando Rios, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 693 days.

(21) Appl. No.: 14/143,971

(22) Filed: Dec. 30, 2013

(65) Prior Publication Data

US 2015/0183138 A1    Jul. 2, 2015

(51) Int. Cl.
*B29C 64/209* (2017.01)
*B29C 64/106* (2017.01)
(Continued)

(52) U.S. Cl.
CPC .......... *B29C 64/209* (2017.08); *B29B 13/022* (2013.01); *B29B 13/08* (2013.01);
(Continued)

(58) Field of Classification Search
CPC ............ B29C 67/0051; B29C 67/0055; B29C 47/862; B29C 47/0002; B29C 64/295; B29C 64/10
See application file for complete search history.

(56) References Cited

U.S. PATENT DOCUMENTS

| | | | |
|---|---|---|---|
| 4,108,576 A | 8/1978 | Landfors | |
| 5,378,879 A * | 1/1995 | Monovoukas | B29C 35/08 156/379.7 |

(Continued)

FOREIGN PATENT DOCUMENTS

| | | |
|---|---|---|
| CN | 202281269 U | 6/2012 |
| GB | 2 422 344 B | 7/2006 |

(Continued)

OTHER PUBLICATIONS

Moon, J.-W., et al., Microbial formation of lanthanide-substituted magnetites by *Thermoanaerobacter* sp. TOR-39, Extremophiles, vol. 11 (2007), pp. 859-867.*

(Continued)

*Primary Examiner* — Matthew J Daniels
(74) *Attorney, Agent, or Firm* — Pauley Erickson & Kottis

(57) ABSTRACT

A method and apparatus for additive manufacturing that includes a nozzle and/or barrel for extruding a plastic material and a supply of polymeric working material provided to the nozzle, wherein the polymeric working material is magnetically susceptible and/or electrically conductive. A magneto-dynamic heater is provided for producing a time varying, high flux, frequency sweeping, alternating magnetic field in the vicinity of the nozzle to penetrate into and couple the working material to heat the material through at least one of an induced transient magnetic domain and an induced, annular current.

19 Claims, 11 Drawing Sheets

(51) Int. Cl.
| | |
|---|---|
| *B29C 64/118* | (2017.01) |
| *B29C 64/20* | (2017.01) |
| *B29B 13/02* | (2006.01) |
| *B29B 13/08* | (2006.01) |
| *B29C 47/86* | (2006.01) |
| *B29C 67/00* | (2017.01) |
| *B33Y 10/00* | (2015.01) |
| *B33Y 30/00* | (2015.01) |
| *B29C 47/00* | (2006.01) |
| *B29K 55/02* | (2006.01) |
| *B29C 35/08* | (2006.01) |
| *B29C 47/08* | (2006.01) |

(52) U.S. Cl.
CPC ........ *B29C 47/0002* (2013.01); *B29C 47/862* (2013.01); *B29C 64/106* (2017.08); *B29C 64/118* (2017.08); *B29C 64/20* (2017.08); *B29C 67/0055* (2013.01); *B29C 67/0085* (2013.01); *B33Y 10/00* (2014.12); *B33Y 30/00* (2014.12); *B29C 47/0014* (2013.01); *B29C 47/0866* (2013.01); *B29C 2035/0811* (2013.01); *B29C 2947/92571* (2013.01); *B29C 2947/92857* (2013.01); *B29K 2055/02* (2013.01)

(56) References Cited

U.S. PATENT DOCUMENTS

| | | | |
|---|---|---|---|
| 5,738,817 A * | 4/1998 | Danforth | B29C 41/36 264/255 |
| 5,837,960 A | 11/1998 | Lewis et al. | |
| 6,046,426 A | 4/2000 | Jeantette et al. | |
| 6,122,564 A | 9/2000 | Koch et al. | |
| 6,129,872 A * | 10/2000 | Jang | B29C 41/36 264/245 |
| 6,143,378 A | 11/2000 | Harwell et al. | |
| 6,144,008 A | 11/2000 | Rabinovich | |
| 6,401,001 B1 | 6/2002 | Jang et al. | |
| 6,401,795 B1 | 6/2002 | Cesarano, III et al. | |
| 6,405,095 B1 | 6/2002 | Jang et al. | |
| 6,410,105 B1 | 6/2002 | Mazumder et al. | |
| 6,423,926 B1 | 7/2002 | Kelly | |
| 6,472,029 B1 | 10/2002 | Skszek | |
| 6,534,745 B1 | 3/2003 | Lowney | |
| 6,641,772 B2 | 11/2003 | Gelbart | |
| 6,706,234 B2 | 3/2004 | Huang | |
| 6,730,252 B1 | 5/2004 | Teoh et al. | |
| 6,793,140 B2 | 9/2004 | Mazumder | |
| 6,830,643 B1 | 12/2004 | Hayes | |
| 6,925,346 B1 | 8/2005 | Mazumder et al. | |
| 6,934,600 B2 | 8/2005 | Jang et al. | |
| 6,937,921 B1 | 8/2005 | Mazumder | |
| 6,940,037 B1 | 9/2005 | Kovacevic et al. | |
| 6,995,334 B1 | 2/2006 | Kovacevic et al. | |
| 7,020,539 B1 | 3/2006 | Kovacevic et al. | |
| 7,045,738 B1 | 5/2006 | Kovacevic et al. | |
| 7,073,561 B1 | 7/2006 | Henn | |
| 7,139,633 B2 | 11/2006 | Mazumder et al. | |
| 7,286,893 B1 | 10/2007 | Mazumder | |
| 7,291,002 B2 | 11/2007 | Russell et al. | |
| 7,301,120 B2 | 11/2007 | Adams | |
| 7,614,866 B2 | 11/2009 | Sperry et al. | |
| 7,625,198 B2 | 12/2009 | Lipson et al. | |
| 7,705,264 B2 | 4/2010 | Hoebel et al. | |
| 7,741,578 B2 | 6/2010 | Adams et al. | |
| 7,765,022 B2 | 7/2010 | Mazumder et al. | |
| 7,827,883 B1 | 11/2010 | Cherng et al. | |
| 7,836,572 B2 | 11/2010 | Mons et al. | |
| 7,910,041 B1 | 3/2011 | Priedeman, Jr. | |
| 7,939,003 B2 | 5/2011 | Bonassar et al. | |
| 7,984,635 B2 | 7/2011 | Callebaut et al. | |
| 8,062,715 B2 | 11/2011 | Skszek et al. | |
| 8,177,348 B2 | 5/2012 | Sidhu et al. | |
| 8,383,028 B2 | 2/2013 | Lyons | |
| 8,419,996 B2 | 4/2013 | Swanson et al. | |
| 9,596,720 B2 * | 3/2017 | Stirling | H05B 6/06 |
| 2002/0065573 A1 | 5/2002 | Mazumder et al. | |
| 2002/0110649 A1 | 8/2002 | Skszek et al. | |
| 2002/0113331 A1 | 8/2002 | Zhang et al. | |
| 2002/0142107 A1 | 10/2002 | Mazumder et al. | |
| 2002/0165634 A1 | 11/2002 | Skszek | |
| 2004/0060639 A1 | 4/2004 | White | |
| 2004/0151978 A1 | 8/2004 | Huang | |
| 2005/0116391 A1 | 6/2005 | Lindemann et al. | |
| 2005/0121112 A1 | 6/2005 | Mazumder et al. | |
| 2005/0280185 A1 | 12/2005 | Russell et al. | |
| 2005/0288813 A1 | 12/2005 | Yang et al. | |
| 2008/0042321 A1 | 2/2008 | Russell et al. | |
| 2009/0014439 A1 | 1/2009 | Kim | |
| 2009/0026175 A1 | 1/2009 | Adams | |
| 2009/0101278 A1 | 4/2009 | Laberge-Lebel et al. | |
| 2009/0200275 A1 | 8/2009 | Twelves, Jr. et al. | |
| 2010/0034982 A1 | 2/2010 | Fuwa | |
| 2010/0125356 A1 | 5/2010 | Shkolnick et al. | |
| 2010/0143668 A1 | 6/2010 | Farmer et al. | |
| 2011/0203937 A1 | 8/2011 | Sidhu | |
| 2011/0293840 A1 | 12/2011 | Newkirk et al. | |
| 2011/0305590 A1 | 12/2011 | Wescott et al. | |
| 2012/0033002 A1 | 2/2012 | Seeler et al. | |
| 2012/0088023 A1 | 4/2012 | Begun | |
| 2012/0159785 A1 | 6/2012 | Pyles et al. | |
| 2012/0161350 A1 | 6/2012 | Swanson et al. | |
| 2012/0162305 A1 | 6/2012 | Swanson et al. | |
| 2012/0164256 A1 | 6/2012 | Swanson et al. | |
| 2012/0164330 A1 | 6/2012 | Swanson et al. | |
| 2012/0201960 A1 | 8/2012 | Hartmann et al. | |
| 2012/0219726 A1 | 8/2012 | Bayer et al. | |
| 2013/0000549 A1 | 1/2013 | Hartmann | |
| 2013/0015596 A1 | 1/2013 | Mozeika et al. | |
| 2013/0034633 A1 | 2/2013 | Von Hasseln | |
| 2013/0089642 A1 | 4/2013 | Lipson et al. | |
| 2013/0101728 A1 | 4/2013 | Keremes et al. | |
| 2013/0101729 A1 | 4/2013 | Keremes et al. | |
| 2016/0194233 A1 * | 7/2016 | Van Pelt | C03B 19/00 65/32.4 |

FOREIGN PATENT DOCUMENTS

| | | |
|---|---|---|
| JP | 57-192202 | 11/1982 |
| WO | WO 2012/072513 A2 | 6/2012 |
| WO | WO 2012/073089 A1 | 6/2012 |

OTHER PUBLICATIONS

P. Yarlagadda et al., "An Innovative Technique for Rapid Product Development by Using Stereolithography Process and Microwave Radiation", Conference Paper, All India Machine Machine Tool Design and Research Conference, Dec. 2001, India.

L.-H. Zhang et al., "Priciple and Feasibility of Electric or Magnetic Field Deflection-Projection Based Rapid Prototyping Technique", Trans. of Tianjin Univ., Mar. 2003, v. 9 pp. 41-44.

Co-pending U.S. Appl. No. 14/143,934, filed Dec. 30, 2013; inventors Chad E. Duty et al.; title: Rapid Electro-Magnetic Heating of Nozzle in Polymer Extrusion Based Depostion for Additive Manufacturing.

Co-pending U.S. Appl. No. 14/143,989, filed Dec. 30, 2013; inventors Chad E. Duty et al.; title: Large Scale Room Temperature Polymer Advanced Manufacturing.

Vega, E. J., et al., "A novel technique to produce metallic microdrops for additive manufacturing," Int. J. Adv Manuf Technol, (2014) vol. 70 pp. 1395-1402.

* cited by examiner

RAPID NON-CONTACT ENERGY TRANSFER FOR ADDITIVE MANUFACTURING DRIVEN HIGH INTENSITY ELECTROMAGNETIC FIELDS

GOVERNMENT RIGHTS

This invention was made with government support under Contract No. DE-ACO5-000R22725 awarded by the U.S. Department of Energy. The government has certain rights in the invention.

FIELD OF THE INVENTION

The present invention relates to a rapid non-contact energy transfer for additive manufacturing driven high intensity electromagnetic fields.

BACKGROUND OF THE INVENTION

Additive manufacturing may be used to quickly and efficiently manufacture complex three-dimensional components layer-by-layer, effectively forming the complex component. Such additive manufacturing may be accomplished using polymers, alloys, powders, solid wire or similar feed stock materials that transition from a liquid or granular state to a cured, solid component.

Polymer-based additive manufacturing is presently accomplished by several technologies that rely on feeding polymer materials through a nozzle that is precisely located over a preheated polymer substrate. Parts are manufactured by the deposition of new layers of materials above the previously deposited layers. Unlike rapid prototyping processes, additive manufacturing is intended to produce a functional component constructed with materials that have strength and properties relevant to engineering applications. On the contrary, rapid prototyping processes typically produce exemplary models that are not production ready.

Heating of the feed or filler material in the nozzle in additive manufacturing is generally accomplished by direct contact between a polymer feed stock and a heating element, typically a resistively heated metal cylinder at elevated temperatures. Likewise, in additive manufacturing, unlike rapid prototyping, the entire component under construction is typically maintained at an elevated temperature in a chamber or furnace until the build is complete. Keeping previously deposited layers at elevated temperature improves the adhesion between the component and newly deposited material while minimizing macroscopic distortion. There are inherent limitations to this technology that prevent higher deposition rates, out of furnace printing and control of microstructural defects (such as pores).

In addition, existing additive manufacturing processes, including fused deposition modeling (FDM), typically exhibit a thermal lag associated with heating a deposition nozzle. Typical fused deposition modeling systems obtain thermal stability by maintaining a massive resistive heater at a constant temperature resulting in slow response.

Magneto-thermal conversion is the conversion of electromagnetic energy into thermal energy. In ferromagnetic magnetic materials, a principle mechanism underlying magneto-thermal conversion is related to externally induced disturbances in the magnetic structure and how strongly the materials resist these disturbances. The dissipated electromagnetic energy is the product of these two and can be transformed into thermal energy among other forms. Therefore the external field should be sufficient to induce disturbances in the magnetic structure while the magnetic material should provide sufficient resistance to dissipate energy yet not resist so strongly that the external fields cannot induce disturbances. It is therefore desired to match the magnetic response of a material with the correct amplitude and frequency of electromagnetic energy. In soft magnetic materials, there is a minimal energetic barrier to either rotate the moment within a domain, or nucleate a reversed domain and move the resulting domain as opposed to hard magnetic materials that resist such disturbances. The energy product associated with magnetic materials is a function of the coercivity, remnant magnetization and magnetic anisotropy. In general, materials with coercivity $\geq 1000$ Oe can be classified as hard ferromagnets. Soft ferromagnets have lower coercivity, and good soft ferromagnets have coercivity $<1$ Oe. Intermediate materials having a coercivity $>1$ Oe and $<1000$ Oe are useful in applications where a magnetic hysteresis losses are required in applications such as, for example, transformation of electromagnetic energy into thermal energy, also known as magneto-thermal conversion

SUMMARY OF THE INVENTION

In response, the present invention is generally directed to a non-contact heating technology that can be used to quickly heat a low thermal mass deposition nozzle, materials within a deposition nozzle, locally heat specific locations of the build and/or uniformly heat the build out of the furnace. This approach preferably reduces the weight of the liquefier and increases the sensitivity and controllability of the flow of polymer, both of which translate to increased build rates.

In addition, removal of joule heating will significantly separate the position dependent heat source from the extruder which impacts part quality. In this manner, a part may be manufactured in accordance with the invention in large scale applications and without reliance on an oven or controlled environment for the build. Further, this technology may be used as a means to apply targeted heating of the polymer material through the build or locally to active manufacturing surface locations. This is accomplished by applying high intensity electromagnetic energy, for instance, transient high flux alternating magnetic fields, to the polymer materials.

Further, the polymer feed materials may be tuned by doping the polymer feed stock with specific magnetically active materials, microscale particles, and/or nano particles. As a result, custom feed materials may be employed depending on the desired characteristics of the build, for instance, carbon fiber may be added to the feed material to tailor conductive properties and thus rapidly and uniformly heat the feed material, when desired.

Other objects and advantages will be apparent to those skilled in the art from the following detailed description taken in conjunction with the appended claims and drawings.

DETAILED DESCRIPTION OF THE INVENTION

The present invention provides a non-contact heating technology that can be used to quickly heat materials within a deposition nozzle, locally heat specific locations of a deposition modeling build and/or uniformly heat the build outside of a furnace or similarly controlled environment. As a result, the weight and size of the liquefier is reduced and sensitivity and controllability of polymer flow is improved, resulting in increased build rates. According to a preferred embodiment, the subject method and apparatus employs high intensity electromagnetic energy, for instance, transient high flux alternating magnetic fields, to polymer working materials resulting in a highly controllable additive manufacturing process.

Figure 1:
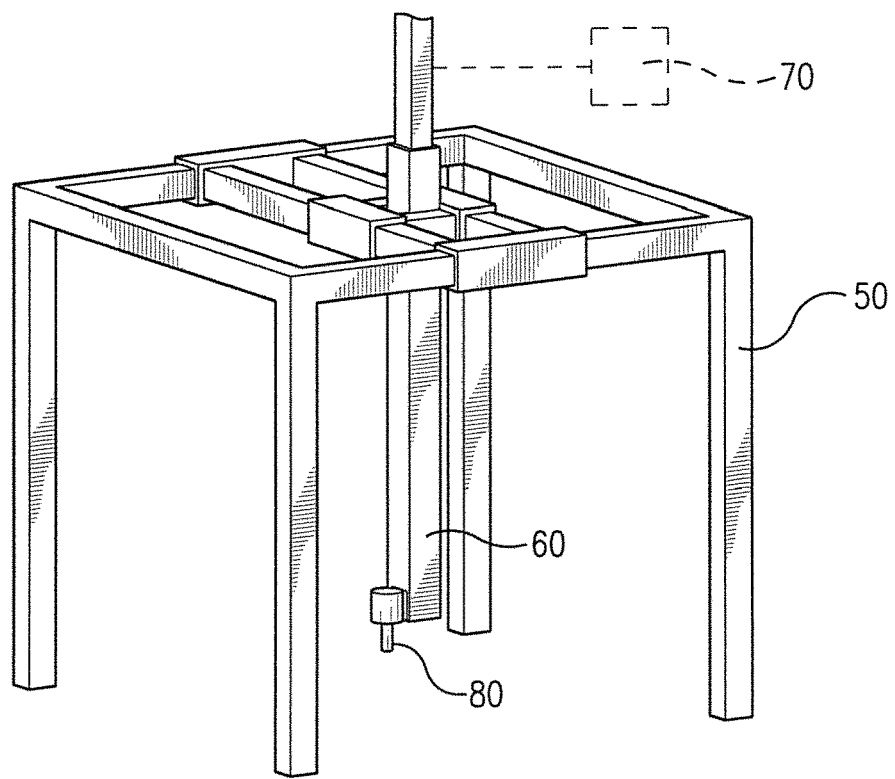
FIG. 1 is a schematic of a system according to one embodiment of this invention.

Although not required, the subject invention may be used in connection with large scale polymer added manufacturing such as the schematic shown in FIG. 1. FIG. 1 shows a frame or gantry 50 for containing a build. The gantry 50 preferably contains a deposition arm 60 that is moveable through the x, y and z-axis. The deposition arm 60 preferably accommodates a supply of working material and a deposition nozzle 80. The supply of working material may be onboard the deposition arm and/or remotely supplied from a wire spool, hopper or similar storage vessel.

Figure 2:
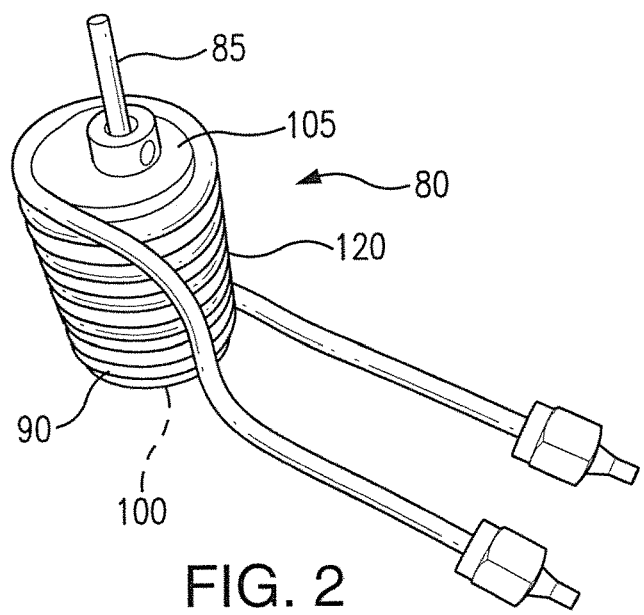
FIG. 2 is a side view of a nozzle according to one embodiment of this invention.

According to a preferred embodiment of the invention, a method of additive manufacturing includes the steps of providing an apparatus for additive manufacturing, for instance the gantry system shown in FIG. 1. The apparatus preferably includes a nozzle 80 for extruding a material, such as shown in FIG. 2. The nozzle 80 preferably operably contacts a polymeric working material that is magnetically susceptible and/or electrically conductive. FIG. 2 shows a preferred embodiment of the nozzle 80 including a barrel 85 through which the working material is provided, a plate 90 and a tip 100 from which the working material is directly deposited on the build. A coil 120 is preferably wrapped around the barrel and/or nozzle and comprises an assembly that may further include a thermally conductive wrap 105 around the barrel and/or nozzle 85, for instance, boron nitride.

Figure 3:
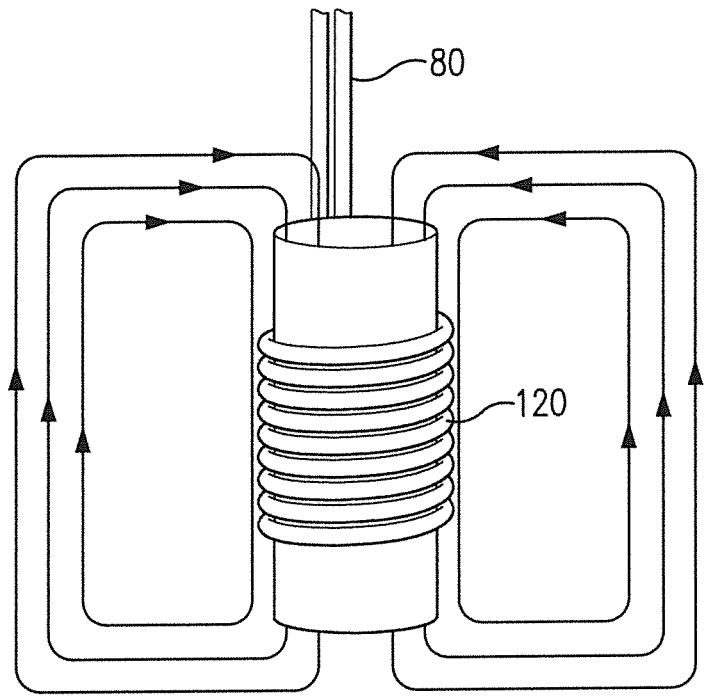
FIG. 3 is a schematic of a nozzle and heater according to one embodiment of this invention.
Figure 4:
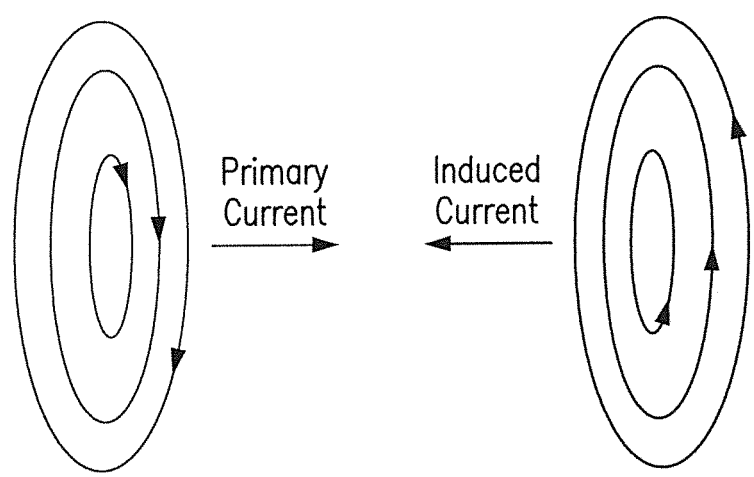
FIG. 4 is a schematic representation of an induced circular current resulting in an opposing magnetic field as generated by the system according to one embodiment of this invention.

A schematic of a deposition nozzle 80 used in such a system is shown in FIG. 3. As shown in FIGS. 3 and 4, rapidly changing magnetic fields transfer energy to the working material matrix by two interrelated mechanisms. Transient magnetic fields penetrate into and are coupled by the magnetic properties of the matrix materials. This leads to an induced circular current that result in the generation of an opposing magnetic field as shown in FIG. 3. The induced current leads to direct electrical resistive heating of the material. Additionally, the external fields lead to generation of magnetically aligned domains that are reversed as the transient magnetic field is swept at high frequency.

Figure 5A:
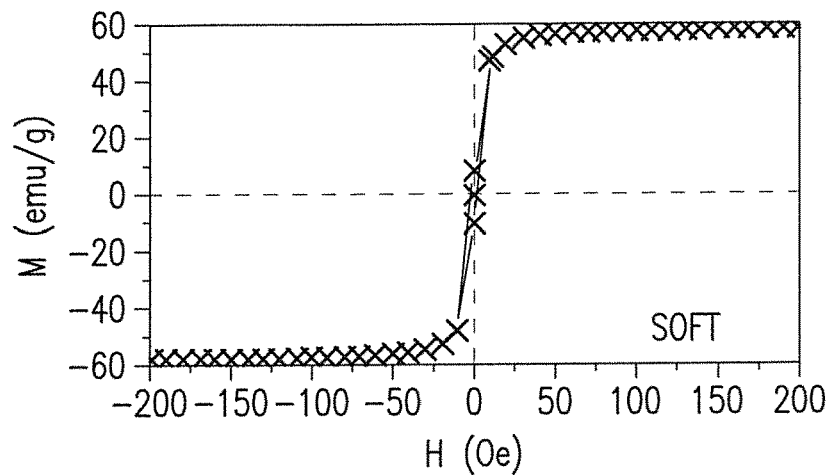
FIG. 5A shows a graph of magnetic response of a soft magnetic test material that can be used to produce enhanced magneto-dynamic heating.
Figure 5B:
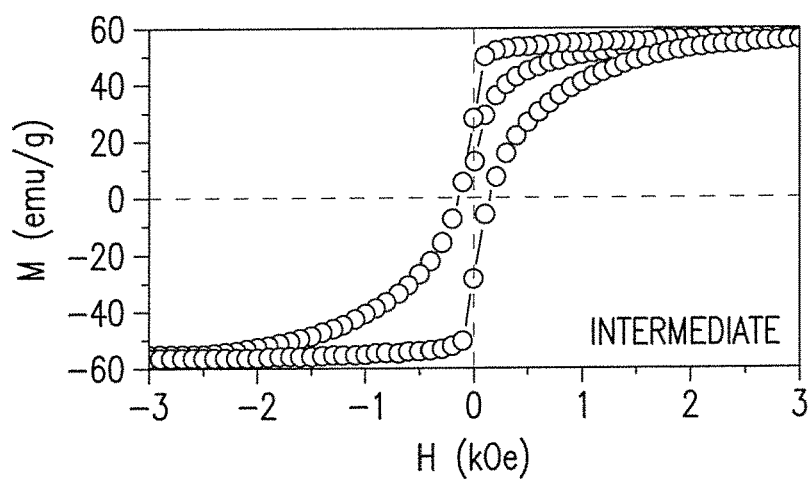
FIG. 5B shows a graph of magnetic response of an intermediate magnetic test material that can be used to produce enhanced magneto-dynamic heating.
Figure 5C:
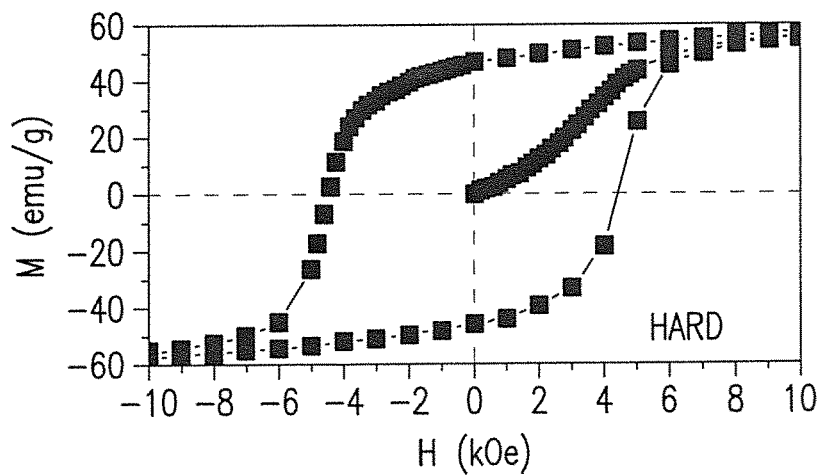
FIG. 5C shows a graph of magnetic response of a hard magnetic test material that can be used to produce enhanced magneto-dynamic heating.

FIGS. 5A-5C show the test results from three examples of magnetic response of materials, for soft, intermediate and hard materials, respectively, that can be used to produce enhanced magneto-dynamic heating. By matching the magnetic response of the material with the electromagnetic wave dynamics, it is possible to tailor the depth of heat transfer enabling precise control of the location and efficiency of energy transfer to the polymer materials.

Accordingly, as shown in FIGS. 2 and 3, a printing nozzle 80 and tip 100 for use in fused deposition modeling includes a metallic material guide or barrel for permitting a desired flow of material wherein the tip 100 is positioned at an end of the material guide or barrel 85, for depositing the material in an appropriate position in space. The printing nozzle 80 may further include a plate 90 at an end of the barrel 85 around the tip 100. The barrel 85 and/or nozzle 80 may be constructed of aluminum or similar metallic material having the desired properties. Alternatively, the barrel may comprise a ceramic or similar non-electrically conductive material that is transparent to electromagnetic energy. This alternative arrangement permits direct heating of the working material from the coil 120.

FIG. 3 also shows an electro-magnetic heating element positioned with respect to the metallic barrel 85 and/or nozzle 80. According to a preferred embodiment of the invention, the electro-magnetic heating element comprises a coil 120 positioned around the barrel 85 and/or nozzle 80. As described above, a thermally conductive wrap 105 may be placed between the barrel 85 and the coil 120.

The coil 120 is preferably an induction heating coil wherein a desired number of turns of the coil 120 are used to introduce inductance into the nozzle 80 thereby producing a desired and controllable heating. Alternatively, a series of coils may be positioned around or with respect to the nozzle 80 to provide the desired heating. According to a preferred embodiment of this invention, the nozzle 80 is directly coupled to the power supply, i.e., the electro-magnetic energy source. The thermal link to the nozzle 80 may thus be quickly and controllably decoupled by decoupling the power supply from the nozzle 80. In this manner, heat control may be precisely administered to the nozzle 80.

The coil 120 may be insulated, for instance, with a TEFLON coating and is preferably tightly wrapped with respect to the barrel 85 and/or nozzle 80 or a conductive coating arranged around the barrel 85 and/or nozzle 80. According to one preferred embodiment of this invention, the coil 120 is arranged with non-uniform spacing. The printing tip 100 having non-uniform spacing may include an arrangement wherein the coil 120 is tighter at a distal end of the barrel 85 and/or nozzle 80.

According to one preferred embodiment, the electromagnetic heating element, particularly the coil 120, is maintained at a lower temperature than the material guide or barrel 85. The printing nozzle 80 may further include a heat exchanger (not shown), primarily for cooling, positioned with respect to at least one of the tip 100 and the barrel 85 to provide a desired cooling to one or both respective components. In this manner, the deposition of material may be precisely controlled so as to avoid and excess or absence of material deposition in the desired locations. The heat exchanger may circulate at least one of helium and nitrogen to provide the desired cooling to the nozzle 80, more specifically to the tip 100 and/or the barrel 85 of the nozzle 80.

The nozzle 80 preferably produces a high frequency (greater than 1 kHz), time varying amplitude, high flux, alternating electromagnetic field in the vicinity of the nozzle 80 so that (i) the time varying magnetic field penetrates into and is coupled by the magnetically susceptible working material to induce transient magnetic domains resulting in heating of the magnetically active components; and/or (ii) the transient magnetic field penetrates into and is coupled by the electrically conductive working material to generate an induced, annular current that causes direct electrical resistive heating of the material. The amplitude is modulated to provide dynamic control of the energy transferred to the build or nozzle 80.

As described above, FIG. 3 shows a schematic of an electromagnetic apparatus according to one preferred embodiment of this invention. According to one embodiment, desired feed materials may be suspended in the apparatus within a coil, for example, water-cooled copper, and subjected to sinusoidal AC fields with a frequency of greater than 1 kHz kHz at several power settings. The feed material samples may be instrumented for surface and internal temperature measurements. The electromagnetic fields are then applied and the temperature was recorded as a function of time.

Figure 6A:
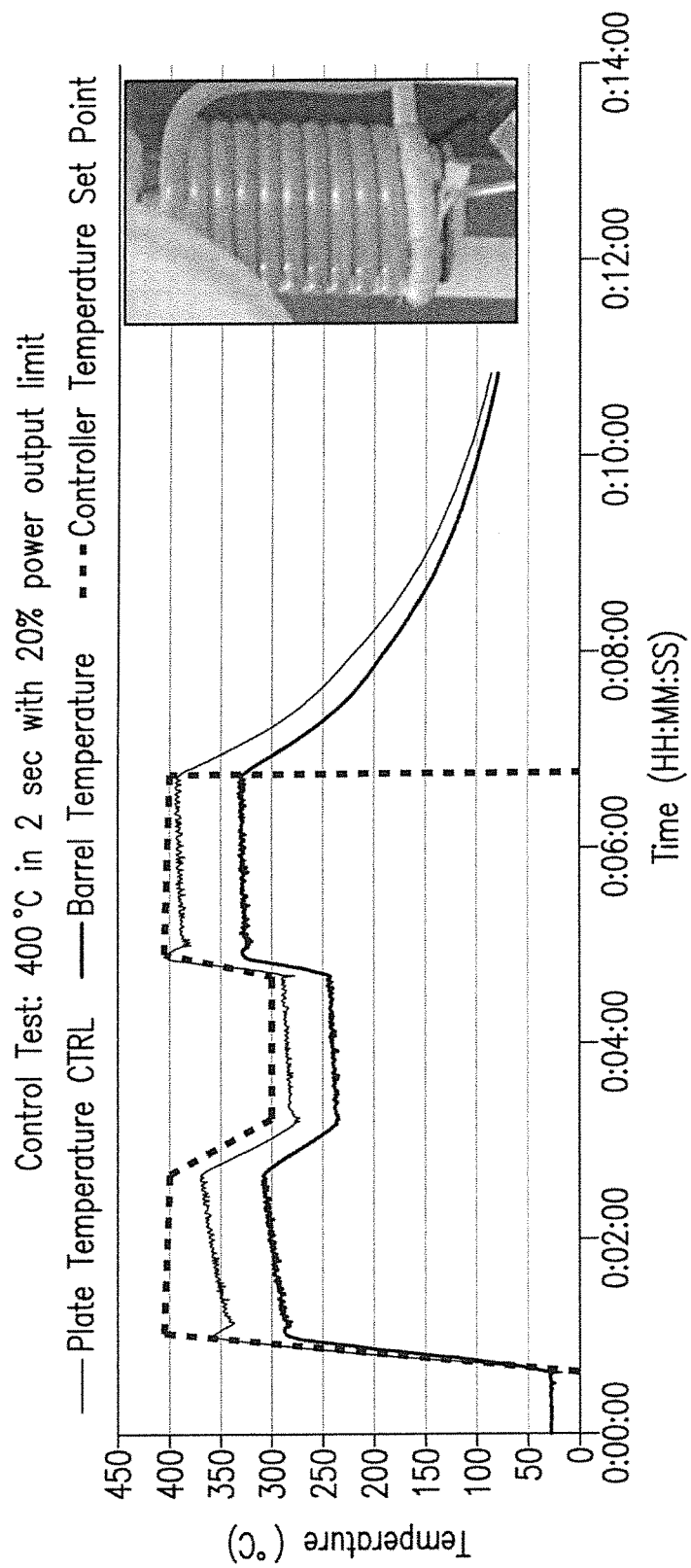
FIG. 6A is a graph demonstrating application of the system according to one embodiment of this invention.
Figure 6B:
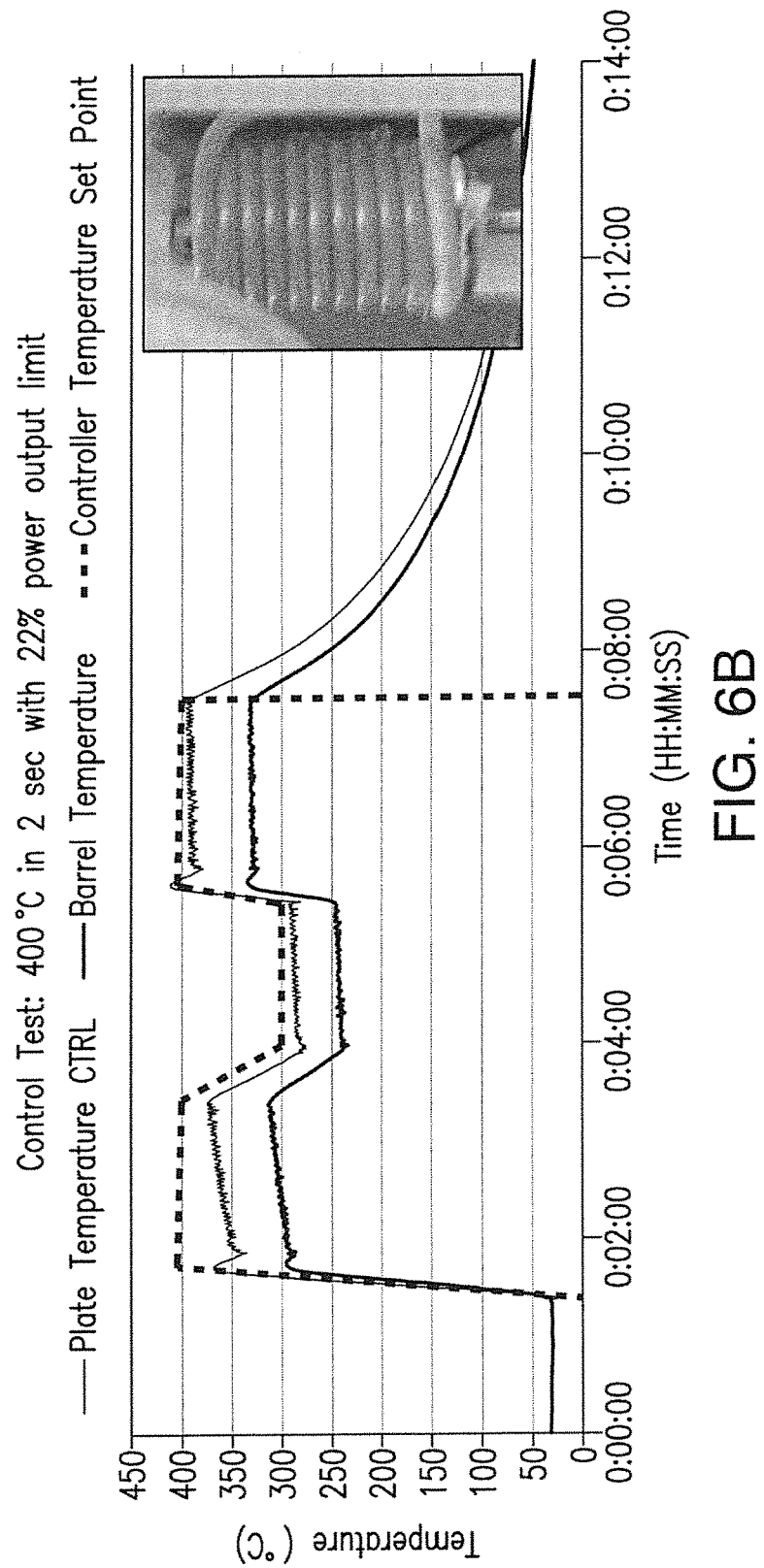
FIG. 6B is a graph demonstrating application of the system according to one embodiment of this invention.

FIGS. 6A-6D demonstrate an application of the limits of this technology to additive manufacturing. Specifically, FIGS. 6A and 6B demonstrate a maximum power output limit, i.e., the threshold beyond which the plate 90 begins to melt. FIG. 6A shows the result of a control test at 400° C. in 2 seconds with a 20% power output limit which resulted in the plate 90 glowing red during heat up. FIG. 6B shows the results of a control test at 400° C. in 2 seconds with a 22% power output limit. The 22% power output resulted in the plate 90 glowing brighter. In this example it was concluded that a 20% maximum power limit was required to match the dynamic thermal response of this system (nozzle 80) and obtain precise temperature control. This set of parameters is specific to the apparatus and can be modified to for compatibility with alternate deposition system sizes and geometries.

Figure 6C:
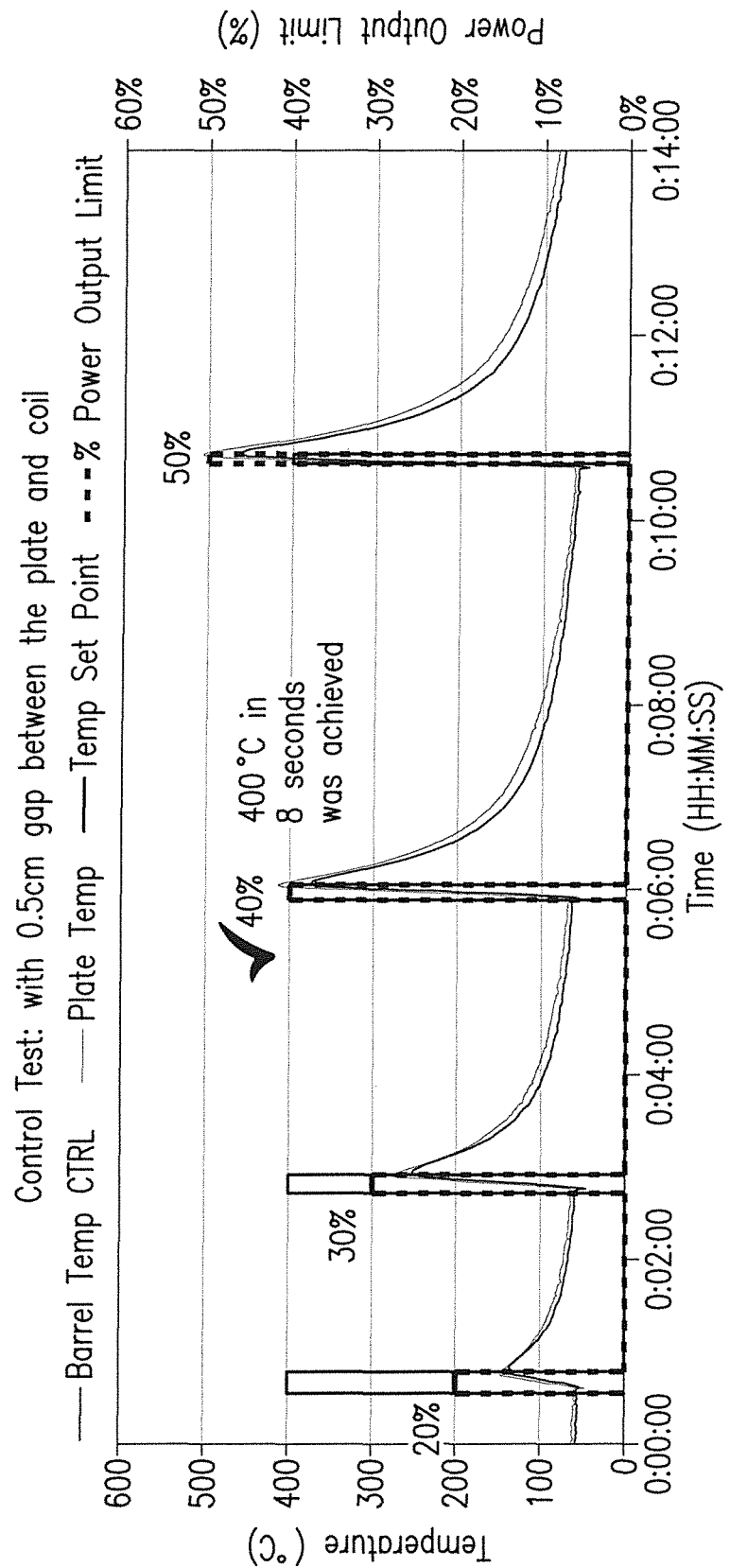
FIG. 6C is a graph demonstrating application of the system according to one embodiment of this invention.

FIG. 6C demonstrates results of a test to displace the plate 90 from the bottom winding at a distance at which the plate 90 and the barrel 85 and/or nozzle 80 are at thermal equilibrium to demonstrate rapid heating of the barrel 85 and/or nozzle 80. The results of this test demonstrate that thermal equilibrium is achieved when the plate 90 was displaced at a distance of 0.50 cm from the bottom winding of the coil 120. In such a manner, temperatures of the barrel 85 and/or nozzle 80 may be quickly attained and adjusted. This provides greater control of the extrusion process that is not possible with typical nozzle designs.

Figure 6D:
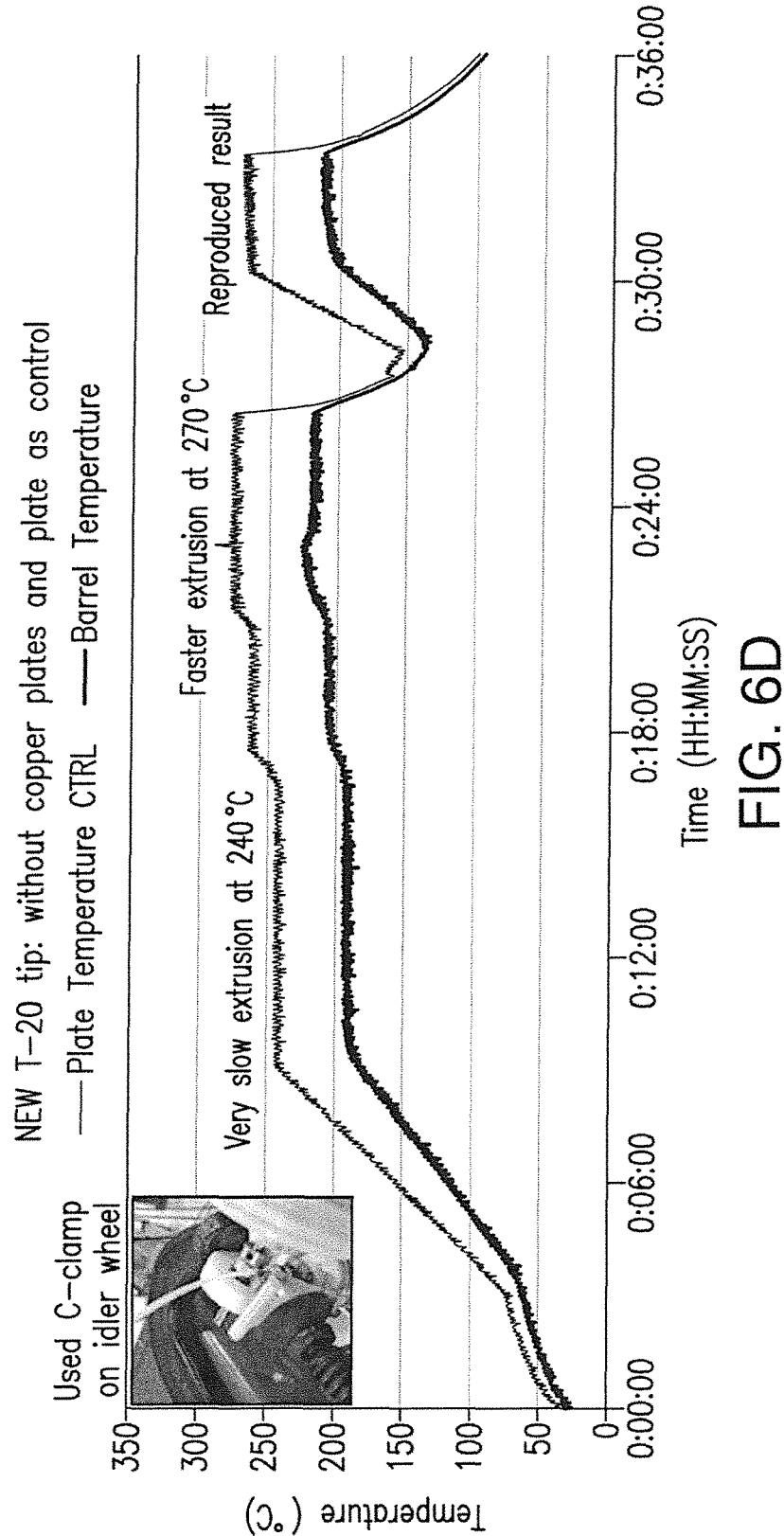
FIG. 6D is a graph demonstrating application of the system according to one embodiment of this invention.

FIG. 6D demonstrates adding power to the coil 120 positioned around the nozzle 80 to extrude plastic by controlling temperature to the plate 90 between 240° C. and 280° C.

According to a preferred embodiment of this invention, heating efficiency and energy transfer dynamics are tunable in this magneto-dynamic approach by tailoring the magnetic and/or the conductive properties of the polymer feed material. This is accomplished by compounding the polymer feed stock with specific magnetically active materials, microscale particles, nano particles, and/or carbon fiber. As a result, a portfolio of tuned polymer feed materials may be employed depending on the desired characteristics of the build.

As described, the polymeric working material is preferably tuned by matching a magnetic response of the working material to an electromagnetic wave. This is preferably accomplished by compounding or doping the working material with magnetically active microscale and/or nano particles to adjust a heating efficiency of the magnetic field. The polymeric working material preferably comprises a thermoplastic or thermosetting polymer, such as nylon or epoxy. Suitable doping agents may include at least one of iron oxide, manganese borate, nano particles, and/or carbon fiber. Suitable nano particles may include at least one of $Ho_{0.06}Fe_{2.94}O_4$ and $Gd_{0.06}Fe_{2.94}O_4$.

According to a preferred embodiment of the invention, the polymeric working material comprises 90-99% thermoplastic or thermosetting polymer and 1-10% doping agent and more preferably 95-99% thermoplastic or thermosetting polymer and 1-5% doping agent.

In addition, FIGS. 7-10 show the results of various tests demonstrating the effectiveness of doped polymer feed materials having iron oxide, manganese borate, nano particles, or carbon fiber.

Figure 7:
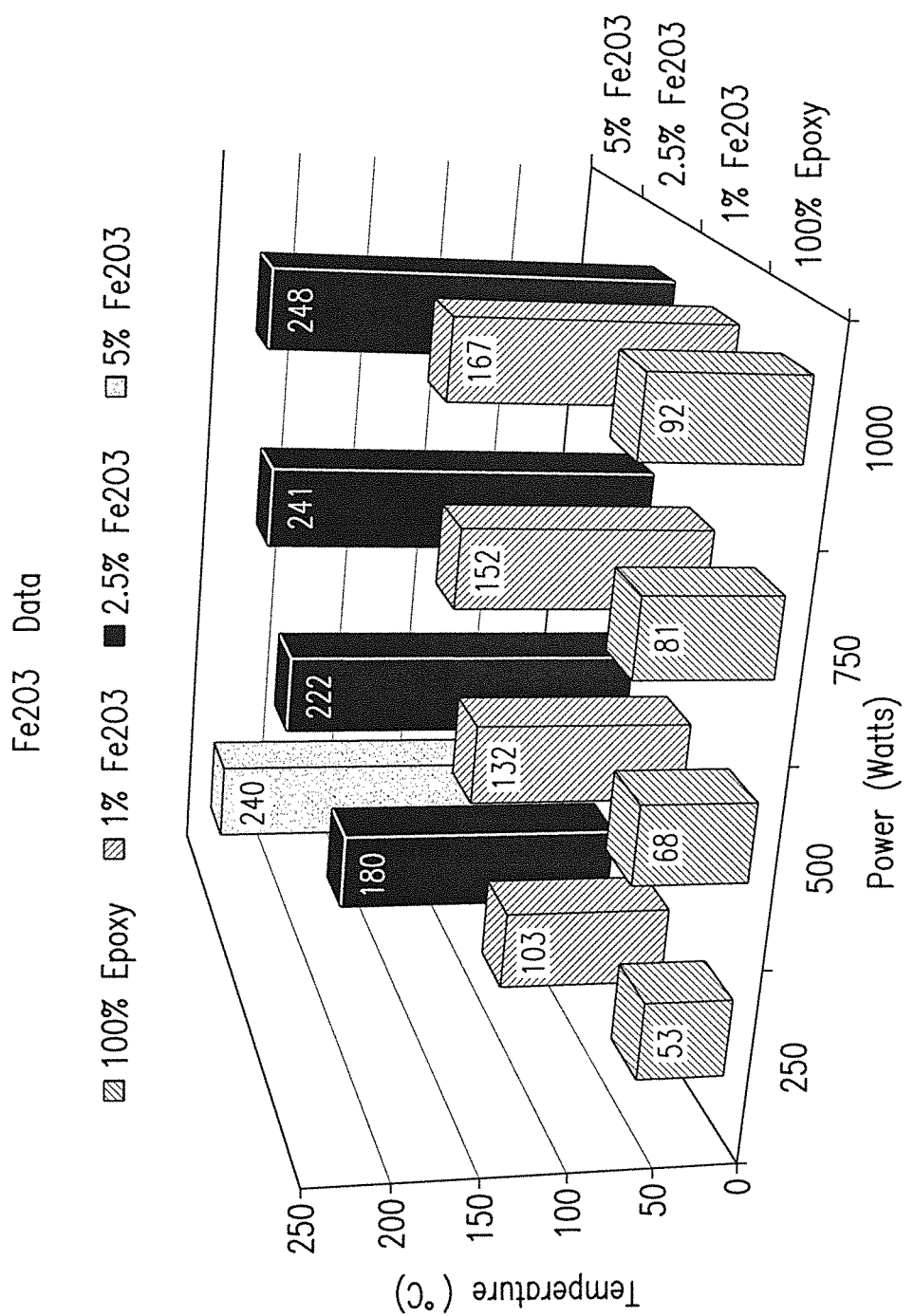
FIG. 7 is a graph showing data for heating thermoplastic or thermosetting polymer doped with iron oxide ($Fe_2O_3$) according to one embodiment of this invention.

Specifically, FIG. 7 is a graph showing data for heating thermoplastic or thermosetting polymer doped with iron oxide ($Fe_2O_3$) according to one embodiment of this invention. As shown, a 2.5% content of iron oxide in thermoplastic or thermosetting polymer substantially boosts attainable temperatures at various power levels of 250, 500, 750 and 1000 Watts, respectively.

Figure 8:
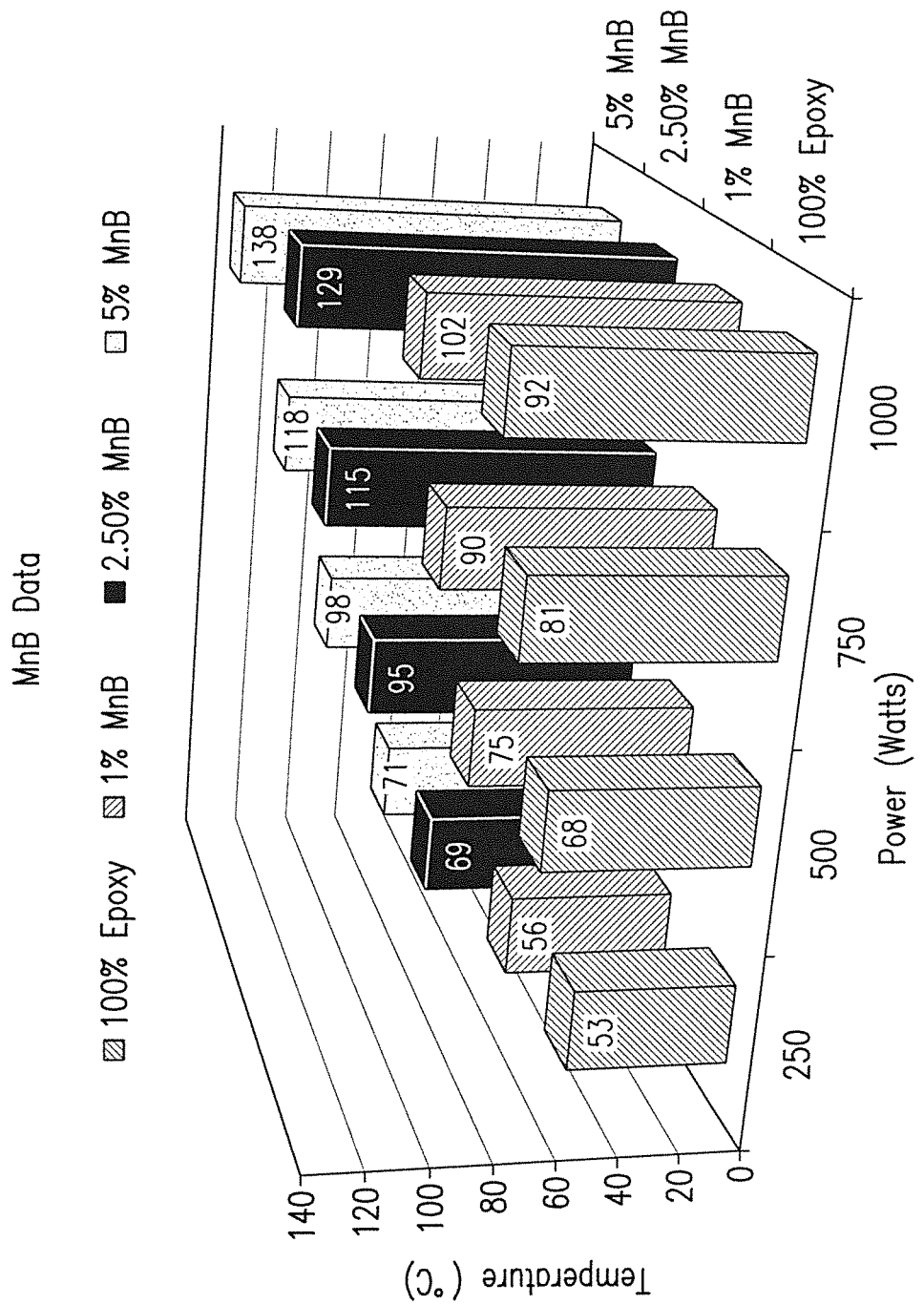
FIG. 8 is a graph showing data for heating thermoplastic or thermosetting polymer doped with manganese borate (MnB) according to one embodiment of this invention.

FIG. 8 is a graph showing data for heating thermoplastic or thermosetting polymer doped with manganese borate (MnB) according to one embodiment of this invention. As shown, a 2.5% but less than 5% content of manganese borate in thermoplastic or thermosetting polymer results in increased temperatures at various power levels of 250, 500, 750 and 1000 Watts, respectively.

Figure 9:
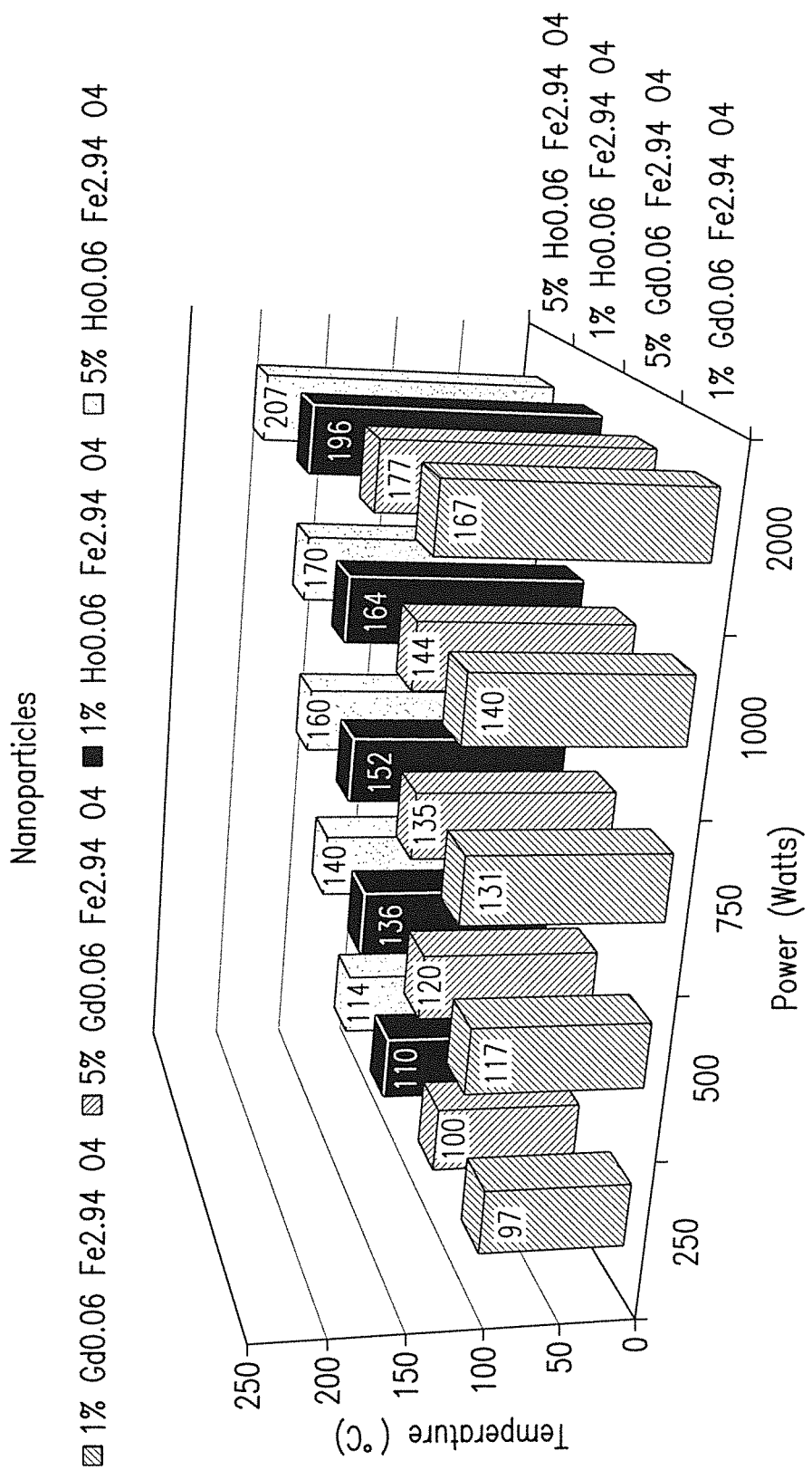
FIG. 9 is a graph showing data for heating thermoplastic or thermosetting polymer doped with nano particles according to one embodiment of this invention.

FIG. 9 is a graph showing data for heating thermoplastic or thermosetting polymer doped with nano particles according to one embodiment of this invention.

Figure 10:
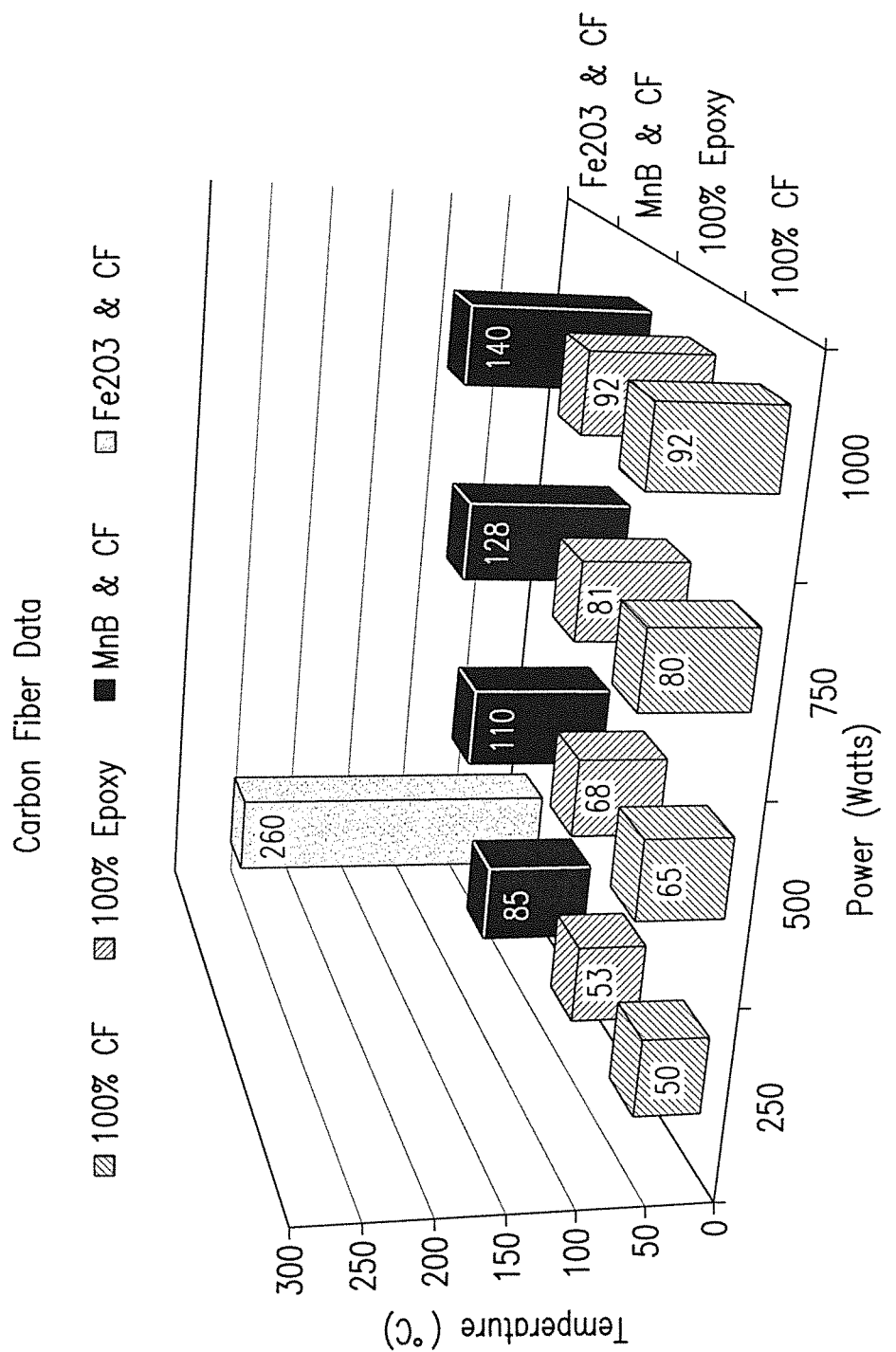
FIG. 10 is a graph showing data for heating thermoplastic or thermosetting polymer doped with carbon fiber according to one embodiment of this invention.

FIG. 10 is a graph showing data for heating thermoplastic or thermosetting polymer doped with carbon fiber according to one embodiment of this invention. As shown, various carbon fiber contents may result in increased temperatures at various power levels of 250, 500, 750 and 1000 Watts, respectively. Functionally, the carbon fiber preferably permits the rapid and uniform distribution of heat generated at the magnetic active centers throughout the build.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of additive manufacturing comprising the steps of:
    a. providing an apparatus for additive manufacturing, the apparatus including a nozzle for extruding a material, the nozzle including a barrel through which a polymeric working material is provided, and a plate extending around the barrel at an end of the barrel adjacent a tip, wherein the barrel is not electromagnetically susceptible and the plate is electromagnetically susceptible;
    b. operably contacting the nozzle with a polymeric working material that has at least one of the properties:
        i. magnetically susceptible, and
        ii. electrically conductive;
    c. producing a time varying, frequency sweeping, alternating magnetic field by an induction heating coil wrapped around the barrel of the nozzle so that at least one of the following processes occurs:
        i. the time varying magnetic field penetrates into and is coupled by the magnetically susceptible working material to induce transient magnetic domains resulting in heating of the magnetically active components to form a flowable deposition material; and
        ii. the transient magnetic field penetrates into and is coupled by the electrically conductive working material to generate an induced, annular current that causes direct electrical resistive heating of the material to form a flowable deposition material;
    wherein the magnetic field further induces heating of the electromagnetically susceptible plate.

2. The method of claim 1, further comprising:
    compounding the working material with magnetically active microscale and nano particles to adjust a heating efficiency of the magnetic field.

3. The method of claim 1 wherein the polymeric working material is both magnetically susceptible and electrically conductive.

4. The method of claim 1 wherein the polymeric working material comprises at least one of a thermoplastic selected from nylon or ABS, or a thermosetting polymer comprising an epoxy.

5. The method of claim 1 wherein the polymeric working material comprises a thermoplastic or thermosetting polymer doped with a doping agent including at least one of iron oxide, manganese borate, and nano particles.

6. The method of claim 5 wherein the nano particles comprise at least one of $Ho_{0.06}Fe_{2.94}O_4$ and $Gd_{0.06}Fe_{2.94}O_4$.

7. The method of claim 5 wherein the polymeric working material comprises 90-99% thermoplastic or thermosetting polymer and 1-10% doping agent.

8. The method of claim 1 wherein the polymeric working material comprises an thermoplastic or thermosetting polymer doped with a doping agent including at least one of iron, Ni, Co, iron oxide, Nickel oxide, Cobalt Oxide, manganese borate, ferromagnetic nano particles and ferrimagnetic nano particles.

9. The method of claim 8 wherein the polymeric working material comprises 95-99% themioplastic or thermosetting polymer and 1-5% doping agent.

10. The method of claim 1, further comprising:
    compounding the working material with magnetically active microscale and nano particles to adjust a heating efficiency of the magnetic field.

11. The method of claim 1 wherein the apparatus comprises a magneto-dynamic heater in combination with the nozzle for producing the time varying, frequency sweeping, alternating magnetic field in the vicinity of the nozzle to penetrate into and couple the working material to heat the material through at least one of the induced transient magnetic domain or the induced, annular current, wherein the polymeric working material is both magnetically susceptible and electrically conductive.

12. The method of claim 1 wherein the polymeric working material is not flowable before heating.

13. The method of claim 1 wherein the apparatus includes a frame or gantry for containing a build without a further heating oven.

14. The method of claim 13, wherein the frame or gantry comprises a deposition arm including the nozzle and moveable through an x, y and z-axis.

15. The method of claim 1 wherein the plate extends perpendicular to the longitudinal direction of the barrel between the induction heating coil and the tip.

16. The method of claim 1 wherein the plate is displaced from a bottom winding of the coil.

17. The method of claim 16, wherein a wrap is disposed between the barrel and the coil and the plate is disposed between the wrap and the tip.

18. The method of claim 1 further comprising maintaining the coil at a lower temperature than the barrel by cooling the coil with a heat exchanger.

19. The method of claim 1 further comprising maintaining the plate at a temperature of 240° C. to 280° C. via the magnetic field.

* * * * *